United States Patent Office 3,155,737
Patented Nov. 3, 1964

3,155,737
PROCESS FOR THE PRODUCTION OF
SUBSTITUTED AZULENES
Klaus Hafner, Munich, and Reinhold Müller, Emmershausen, Kreis Usingen, Germany, assignors to Studiengesellschaft Kohle m.b.H., Mulheim (Ruhr), Germany
No Drawing. Filed May 11, 1962, Ser. No. 194,150
Claims priority, application Germany, May 25, 1961,
St 17,868
3 Claims. (Cl. 260—666)

U.S. Patent 2,804,485 describes a process of producing substituted azulenes in which an azulene which is unsubstituted in at least one of the 4- and 8-positions is reacted with a metal compound selected from the group consisting of alkyl, aryl and aralkyl compounds of at least one metal of the first three groups of the periodic table. The addition product thus obtained is then treated with a compound containing an acid hydrogen atom. The dihydroazulene thus obtained is subjected to a dehydrogenation treatment so as to form the corresponding substituted azulene. The conversion of the addition products into the dihydroazulenes can be effected by treatment with alcohol, water or other compounds containing an acid hydrogen atom.

The dihydroazulenes are transformed even in the cold into the azulenes by treatment with dehydrogenation agents, such as for example chloranil. The dehydrogenation can however also be carried out by thermal decomposition in vacuo or by steam distillation, preferably in the presence of a hydrogen acceptor. The second and the third step of the known process may be carried out as a one stage process by subjecting the addition products obtained by the first step of our process to a thermal decomposition or to steam distillation.

The known process proceeds in accordance with the following equation:

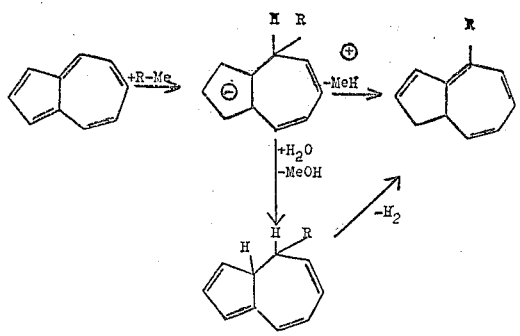

It has now surprisingly been found that azulenes already substituted in the 4- and 8-position, but unsubstituted in the 6-position, react with organometallic compounds to form addition compounds of the type I below

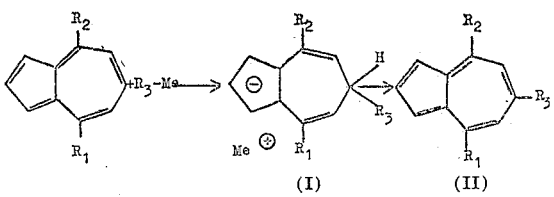

The addition compounds of the type I can be transformed into the corresponding azulenes of the type II substituted in the 4-, 6- and 8-position either directly by thermal splitting off of metal hydride or by hydrolysis to a dihydroazulene and subsequent dehydrogenation.

As organometallic compounds the metal compounds selected from the group consisting of alkyl, aryl and aralkyl compounds of at least one metal of the first 3 groups of the periodic table, preferably the unsubstituted alkyl, aryl and aralkyl compounds of the alkali metals can be used. Examples of complex compounds of the alkyl, aryl and aralkyl compounds of the alkali metals with other metallohydrocarbon compounds are sodium aluminium tetraethyl and dilithium zinc tetraethyl. The complex compounds capable of reacting in accordance with the invention are generally alkali metal compounds of the aforementioned type and compounds of the type $Me(R)_n$, in which Me stands for aluminium, zinc, beryllium, magnesium, boron or another complex-forming metal, R for alkyl, aryl or aralkyl radicals and $n$ for the valency of the metal compound.

The reaction of the starting materials is preferably carried out in the presence of inert organic solvents, such as benzene, toluene, xylene or, preferably ether. The addition generally takes place very readily, even at room temperature. The addition products are generally greyish-brown crystalline products.

The dihydroazulenes can be obtained by treating an addition product with a compound containing an acid hydrogen atom.

The dihydroazulenes may be converted in the cold into the azulenes by treatment with a dehydrogenation agent such as for example chloranil. The dehydrogenation can however also be carried out by thermal decomposition in vacuo; alternatively it is possible to use steam distillation, preferably in the presence of a hydrogen acceptor.

If the addition products are subject to steam distillation or thermal decomposition, the corresponding azulenes are obtained directly.

The 4,6,8-trisubstituted azulenes obtainable by the process of the invention are partly known and partly new products. They are to be used in the therapeutic and cosmetic field. It is known that the oils obtainable by extracting camomiles contain azulenes and that the therapeutic and cosmetic properties of these oils are due to the azulenes contained therein. The products obtainable by the process of the invention have similar valuable properties. They can be used instead of the said oils in the treatment of wounds, bronchitis, sickness of the gall bladder and in the cosmetic field.

The following examples explain the invention:

EXAMPLE 1

4,6,8-Trimethylazulene 1 g. of 4,8-dimethylazulene is dissolved in 50 ml. of absolute ether. 5 ml. of a 1.3-molar ethereal lithium methyl solution are added to the thoroughly stirred solution in an ultra-pure nitrogen atmosphere with the exclusion of moisture. The colour of the azulene solution changes immediately from blue to yellowish green. When a sample is decomposed with water, no azulene is recovered. The reaction mixture is cooled in a freezing mixture (methanol/Dry Ice) to $-70°$ and decomposed with 5 ml. of absolute methanol. The freezing mixture is removed and 1.7 g. of chloranil in 50 ml. of absolute benzene are added to the reaction solution. The solution is then slowly heated with stirring to boiling point. The reaction solution, which is dirty blue in colour, is diluted after about 4–5 hours with petroleum ether and washed with 4% sodium hydroxide solution until the aqueous phase is colourless. The petroleum ether phase is washed neutral with water and dried over calcium chloride. The solvent is extracted in vacuo and the residual susbtance is subjected to chromatography on aluminium oxide, neutral activity grade 1 using petroleum ether as solvent. After the eluate has been concentrated by evaporation, the 4,6,8-trimethylazulene is obtained as blackish violet crystals with a melting point of 82° which corresponds to that of the known 4,6,8-trimethylazulene. Trinitrobenzolate, M.P. 173–174°.

Yield: 0.75 g. of 4,6,8-trimethylazulene (69% of theoretical).

EXAMPLE 2

*4,8-Dimethyl-6-Ethylazulene*

5 g. of 4,8-dimethylazulene are dissolved in 50 ml. of absolute ether and reacted under ultra-pure nitrogen and while stirring with 33 ml. of a 1-molar ethereal lithium ethyl solution. The colour of the azulene solution changes immediately from blue to orange. The reaction mixture is cooled in a freezing mixture (methanol/Dry Ice) to $-70°$ and decomposed with 25 ml. of absolute methanol. The freezing mixture is removed and 9 g. of chloranil in 200 ml. of absolute benzene are added. The solution is heated while stirring to boiling point for about 4-5 hours. The dark violet solution is diluted with petroleum ether and washed with 4% sodium hydroxide solution until the aqueous layer is colourless. The petroleum ether phase is washed neutral with water and dried over calcium chloride. The solvent is removed in vacuo and the remaining blue oil is subjected to chromatography with petroleum ether as solvent over neutral aluminium oxide, activity grade 2. The 4,8-dimethyl-6-ethylazulene is obtained as a semi-solid blue oil which solidifies after several weeks in the cold to form bluish violet crystals with the melting point 34–38°. Trinitrobenzolate M.P. 142°.

The spectrum in the visible range shows a strong maximum at 546 m/$\mu$ and shows shoulders at 564, 588 and 650 m/$\mu$.

Yield: 3.5 g. of 4,8-dimethyl-6-ethylazulene (59% of the theoretical).

EXAMPLE 3

*4,8-Dimethyl-6-n-Propylazulene*

8 g. of 4,8-dimethylazulene are dissolved in 200 ml. of absolute ether and the reaction vessel is filled with ultra-pure nitrogen. 37 ml. of a 1,4-molar ethereal lithium-n-propyl solution are added to the thoroughly stirred solution with exclusion of moisture and air. The colour of the azulene solution changes immediately from blue to orange. The reaction mixture is cooled in a freezing mixture (methanol/Dry Ice) to $-70°$ and decomposed with 40 ml. of absolute methanol. The freezing mixture is removed and it is dehydrated with 13 g. of chloranil in 300 ml. of absolute benzene under the same conditions as described in Examples 1 and 2. The working up is also effected as described in Examples 1 and 2. The 4,8-dimethyl-6-n-propylazulene is obtained as a violet semi-solid substance. The melting point of the tri-nitro-benzolate is 136° C. The spectrum in the visible range shows a strong maximum at 546 m$\mu$ and shoulders at 564, 588 and 650 m$\mu$.

Yield: 8 g. of 4,8-dimethyl-6-n-propylazulene (69% of the theoretical).

EXAMPLE 4

*4,8-Dimethyl-6-Butylazulene*

5 g. of 4,8-dimethylazulene are dissolved in 200 ml. of absolute ether and the reaction vessel is filled with ultra-pure nitrogen. 20 ml. of a 1.8-molar benzenic lithium butyl solution are added dropwise to the thoroughly stirred solution. The colour of the azulene solution changes immediately from blue to orange. The decompostion is effected with 25 ml. of absolute methanol under the same conditions as in Examples 1–3. Dehydrogenation is carried out with 9 g. of chloranil in 200 ml. of absolute benzene. Working up is again carried out as described in Examples 1–3. 4.5 g. of 4,8-dimethyl-6-butylazulene are obtained as a violet oil which solidifies to crystals with the melting point 46–48° after standing for some time in the cold. Trinitrobenzolate M.P. 105°. The spectrum in the visible range comprises a strong maximum at 546 m$\mu$ and has shoulder at 564, 588 and 646 m$\mu$.

Yield: 4.5 g. of 4,8-dimethyl-6-butylazulene (66% of the theoretical).

EXAMPLE 5

*4,8-Diphenyl-6-Butylazulene*

1 g. of 4,8-diphenylazulene is dissolved in 50 ml. of absolute ether and the reaction vessel is filled with ultra-pure nitrogen. 2.6 ml. of a 1.38-molar benzenic lithium butyl solution are added with exclusion of moisture and air to the thoroughly stirred solution. The colour of the azulene solution changes from blue to deep red. The reaction mixture is cooled with a freezing mixture (methanol/Dry Ice) to $-70°$ and decomposed with 5 ml. of excess absolute methanol. The freezing mixture is removed and dehydrogenation is carried out with 0.9 g. of choranil in 50 ml. of absolute benzene, as described in Examples 1–3. The working up is also carried out as previously described. The 4,8-diphenyl-6-butylazulene is obtained as a blue oil. Molecular weight: found 326.5, calculated: 336. The spectrum in the visible range comprises a strong maximum at 571 m$\mu$, and shoulders at 609 m$\mu$ and 674 m$\mu$. Yield: 0.43 g. of 4,8-diphenyl-6-butylazulene (36% of the theoretical).

EXAMPLE 6

*4,8-Dimethyl-6-Phenylazulene*

1 g. of 4,8-dimethyl-azulene is dissolved in 50 ml. of absoulte ether in an ultra-pure nitrogen atmosphere. 6 ml. of a 1.2-molar etheral lithium phenyl solution are added. The blue colour of the reaction solution changes immediately to reddish orange. Decomposition is carried out at $-70°$ with absolute methanol and dehydrogenation with 1.7 g. of chloranil in 50 ml. of absolute benzene. The reaction solution is worked up as described in Examples 1–3. The 4,8-dimethyl-6-phenylazulene is obtained as blue crystals with the melting point 101° 64 which corresponds to that of the known 4,8-dimethyl-6-phenylazulene. The spectrum in the visible range shows a strong maximum at 564 m$\mu$ and shoulders at 604 and 633 m$\mu$.

Yield: 0.6 g. of 4,8-dimethyl-6-phenylazulene (46% of the theoretical).

EXAMPLE 7

*4-Methyl-6,8-Diphenylazulene*

3 g. of 4-methyl-8-phenylazulene are dissolved in an ultra-pure nitrogen atmosphere in 100 ml. of absolute ether. 10 ml. of a 1.2-molar ethereal lithium phenyl solution are added. The blue azulene colour changes slowly to a dirty yellow. Decomposition is effected at $-70°$ with absolute methanol, and dehydrogenation with 3.5 g. of chloranil in 150 ml. of absolute benzene and working up takes place as described in Examples 1–3. It is subjected to chromatography on neutral aluminium oxide, activity grade 3. The 4-methyl-6.8-diphenyl-azulene is obtained as a blue, viscous oil. Molecular weight: found: 228, calculated: 294.

The spectrum in the visible range comprises a strong maximum at 579 m$\mu$ and shoulders at 618 and 680 m$\mu$.

Yield: 1.5 g. of 4-methyl-6.8-diphenylazulene (40% of the theoretical).

What we claim is:

1. In a process of producing substituted azulenes, the step of reacting an azulene which is substituted in the 4- and 8-position and unsubstituted in the 6-position with a metal compound selected from the group consisting of alkyl, aryl and aralkyl compounds of the alkali metals.

2. In a process of producing substituted azulenes, the step of reacting an azulene which is substituted in the 4- and 8-position and unsubstituted in the 6-position with a metal compound selected from the group consisting of alkyl, aryl and aralkyl compounds of the alkali metals, thereby forming an addition product; and treating said addition product with a compound containing an acid hydrogen atom.

3. In a process of producing substituted azulenes, the step of reacting an azulene which is substituted in the 4- and 8-position and unsubstituted in the 6-position with a metal compound selected from the group consisting of alkyl, aryl and aralkyl compounds of the alkali metals, thereby forming an addition product; treating said addition product with a compound containing an acid hydrogen atom, thereby forming a dihydroazulene; and subjecting said dihydroazulene to a dehydrogenation treatment so as to form the corresponding substituted azulene.

References Cited in the file of this patent
UNITED STATES PATENTS 2,804,485 Ziegler et al. _____ Aug. 27, 1957
2,900,426 Ziegler et al. _____ Aug. 18, 1959

OTHER REFERENCES

K. Hafner et al.: Introduction of Substitutents into the 7-Ring of Azulene with the Help of Organometallic Compounds, Angewandte Chemie, vol. 67, pages 302 and 348 relied on (1955).

K. Hafner: Simple Synthesis of Substituted Azulenes, Analen der Chemie vol. 618, page 150 relied on (1958).